United States Patent
Kim et al.

(10) Patent No.: US 8,687,043 B2
(45) Date of Patent: Apr. 1, 2014

(54) METHOD OF GENERATING STEREOSCOPIC IMAGE SIGNAL AND METHOD OF SCALING THE SAME

(75) Inventors: Sung-sik Kim, Seoul (KR); Tae-hyeun Ha, Seoul (KR); Jae-phil Koo, Seoul (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 170 days.

(21) Appl. No.: 13/025,774

(22) Filed: Feb. 11, 2011

(65) Prior Publication Data

US 2011/0134219 A1 Jun. 9, 2011

Related U.S. Application Data

(62) Division of application No. 11/210,816, filed on Aug. 25, 2005, now abandoned.

(30) Foreign Application Priority Data

Aug. 26, 2004 (KR) .............................. 10-2004-67434

(51) Int. Cl.
  *H04N 13/00* (2006.01)
  *H04N 13/02* (2006.01)
  *H04N 13/04* (2006.01)
  *H04N 9/47* (2006.01)

(52) U.S. Cl.
  USPC ................... 348/42; 348/43; 348/46; 348/51; 348/54

(58) Field of Classification Search
  USPC ..................... 348/42, 43, 46, 51, 54
  See application file for complete search history.

(56) References Cited

U.S. PATENT DOCUMENTS

| 6,522,351 | B1 | 2/2003 | Park | |
| 7,180,554 | B2 * | 2/2007 | Divelbiss et al. | 348/742 |
| 7,324,158 | B2 * | 1/2008 | Lin | 348/448 |
| 2002/0024592 | A1 | 2/2002 | Uomori et al. | |
| 2002/0122585 | A1 | 9/2002 | Swift et al. | |
| 2007/0257902 | A1 | 11/2007 | Satoh et al. | |

FOREIGN PATENT DOCUMENTS

| CN | 1243263 | 2/2000 |
| EP | 1587330 | 10/2005 |
| JP | 63-94794 | 4/1988 |
| JP | 02-067895 | 3/1990 |
| JP | 07-255068 | 10/1995 |
| JP | 09-149434 | 6/1997 |
| JP | 2004-104368 | 4/2004 |

(Continued)

OTHER PUBLICATIONS

Examination Report issued Mar. 28, 2011 in Indian Patent Application No. 1102/CHE/2005.

(Continued)

*Primary Examiner* — Geepy Pe
(74) *Attorney, Agent, or Firm* — Stanzione & Kim, LLP

(57) ABSTRACT

A method of generating a stereoscopic image signal and scaling the same includes receiving a left-eye image signal and a right-eye image signal, generating a progressive stereoscopic image signal by multiplexing the left-eye image signal and the right-eye image signal, and scaling up or down the progressive stereoscopic image signal. Accordingly, it is possible to simplify a structure of an apparatus to generate the stereoscopic image signal and reduce manufacturing costs of the apparatus to generate the stereoscopic image signal.

14 Claims, 4 Drawing Sheets

(56) References Cited

FOREIGN PATENT DOCUMENTS

| | | |
|---|---|---|
| KR | 100270804 | 8/2000 |
| KR | 2001-11383 | 2/2001 |
| KR | 100306695 | 8/2001 |
| KR | 2002-96203 | 12/2002 |
| KR | 2004-154 | 1/2004 |
| WO | 84/00866 | 3/1984 |
| WO | 2004066203 | 8/2004 |
| WO | 2004066639 | 8/2004 |
| WO | 2004/093469 | 10/2004 |
| WO | 2005/029871 | 3/2005 |

OTHER PUBLICATIONS

Dutch Search Report dated Nov. 28, 2007 issued in NO 1029687.
Chinese Office Action issued Oct. 17, 2008 in CN Application No. 200510093588.0.
Japanese Office Action issued on Jan. 18, 2011 in JP Patent Application 2005-244944.

* cited by examiner

METHOD OF GENERATING STEREOSCOPIC IMAGE SIGNAL AND METHOD OF SCALING THE SAME

CROSS-REFERENCE TO RELATED APPLICATIONS

This application is a divisional application of Ser. No. 11/210,816, filed Aug. 25, 2005, now abandoned which claims the benefit under 35 U.S.C. §119 of Korean Patent Application No. 10-2004-67434, filed on Aug. 26, 2004, in the Korean Intellectual Property Office, the disclosure of which is incorporated herein in its entirety by reference.

BACKGROUND OF THE INVENTION

1. Field of the Invention

The present general inventive concept relates to a stereoscopic image signal, and more particularly, to a method of generating a progressive stereoscopic image signal and a method of scaling the same.

2. Description of the Related Art

In general, a stereoscopic image is based on a stereo view angle by human eyes. Binocular parallax, which is due to the right and left eyes being about 65 mm apart from each other, is the most critical factor of a feeling of solidity.

There are two types of stereoscopic displays, one with glasses and another without glasses. The non-glasses type stereoscopic display obtains a stereoscopic image by separating a left-eye image from a right-eye image without glasses.

The glasses type stereoscopic display displays left and right parallax images on a direct-view display or projector with directions of polarization changed or in a time-divisional manner. The stereoscopic image can be seen with polarization glasses or liquid-crystal shutter glasses.

The non-glasses type stereoscopic display includes a parallax barrier type, a lenticular type, a polarization multiplexing type, etc.

The parallax barrier type stereoscopic display displays images for individual eyes alternatively in the horizontal direction by the space of a pixel, and then the displayed images are seen through a vertical grating, or a so called "barrier," Thus the displayed images are separated from each other by the barrier to be seen by the left and right eyes respectiveiy so that a stereoscopic image is seen.

In the polarization multiplexing type stereoscopic display, a progressive stereoscopic image signal, in which the left-eye image signal and the right-eye image signal are alternately arranged in scanning lines, is displayed and then polarized by passing the progressive stereoscopic image signal through two polarization filters with different polarizing characteristics so that the left eye can only see odd-numbered scanning lines of the progressive stereoscopic image signal and the right eye can only see even-numbered scanning lines of the progressive stereoscopic image signal. Examples of a stereoscopic display device using the polarization multiplexing method are disclosed in Korean Patent Laid-open Publication Nos. 1999-80351 (published on Jan. 5, 1999) and 2002-96203 (published on Dec. 31, 2002) and in Japanese Patent Laid-open Publication No. 09-149434 (published on Jun. 6, 1997 etc.

FIG. 1 is a diagram illustrating a conventional polarization multiplexing type stereoscopic display device. Referring to FIG. 1, the conventional stereoscopic display device includes a display panel 102 which displays a progressive stereoscopic image signal and a polarization film unit 104 which is comprised of a plurality of first polarization lines 112 and a plurality of second polarization lines 114. The first and second polarization lines 112 and 114 are alternately arranged in the polarization film unit 104 in a vertical scanning direction and have different polarization characteristics. Specifically, the first polarization lines 112 have first polarization characteristics, and the second polarization lines 114 have second polarization characteristics. The first polarization lines 112 are used for providing a user with a left-eye image, and the second polarization lines 114 are used for providing the user with a right-eye image.

The conventional stereoscopic display device displays a progressive stereoscopic image signal and polarizes the displayed image signal through the first and second polarization lines 112 and 114 so that a user views odd-numbered scanning lines of the stereoscopic image signal with his or her left eye and views even-numbered scanning lines of the stereoscopic image signal with his or her right eye.

FIG. 2 is a diagram illustrating a progressive stereoscopic image signal displayed by the conventional stereoscopic display device of FIG. 1. Referring to FIG. 2, the progressive stereoscopic image signal has a size N1×N2. Odd-numbered scanning lines of the progressive stereoscopic image signal belong to a left-eye image signal, and even-numbered scanning lines of the progressive stereoscopic image signal belong to a right-eye image signal. Here, the left-eye image signal and the right-eye image signal are taken by a left-eye image camera and a right-eye image camera, respectively, which are separated from each other by the same distance as the distance between human eyes FIG. 3 is a block diagram illustrating a conventional apparatus for generating the progressive stereoscopic image signal of FIG. 2. Referring to FIG. 3, the conventional apparatus for generating the progressive stereoscopic image signal includes a first scaler 302, which receives the left-eye-image signal and scales the received left-eye image signal up or down, a second scaler 304, which receives the right-eye image signal and scales the received right-eye image signal up or down, and a multiplexer 316, which generates the progressive stereoscopic image signal by multiplexing the up-scaled or down-scaled left-eye image signal and the up-scaled or down-scaled right-eye image signal.

For a three-dimensional (3D) stereo broadcast, an interlaced stereoscopic image signal whose odd-numbered fields belong to the left-eye image signal and whose even-numbered fields belong to the right-eye image signal is transmitted. Standard digital TV sets provide a fixed resolution of 720× 408 i/p or 1920×1080 i/p where i stands for 'interlaced,' and p stands for 'progressive.'

In general, display devices adopt a progressive scanning method and can render an image with various resolutions. Thus, in order to make a display device compatible with a 3D stereo broadcast, a de-interlacing operation and a scaling operation are needed to convert the interlaced stereoscopic image signal into the progressive stereoscopic image signal.

Referring to FIG. 3, the first and second scalers 302 and 304 perform a scaling operation. Specifically, each of the first and second scalers 302 and 304 may scale up an input image signal in a vertical scanning direction according to a resolution provided by a display device, by using either a bilinear interpolation method or a convolution interpolation method with reference to the degree of correlation between adjacent scanning lines of the image signal.

The multiplexer 316 performs interlacing.

FIG. 4 is a diagram illustrating the operation of the multiplexer 316 of FIG. 3. Referring to FIG. 4, the multiplexer 316 obtains the progressive stereoscopic image signal of FIG. 2 by multiplexing a left-eye image signal 402 and a right-eye image signal 404 so that the scanning lines of the left-eye image signal 402 and the scanning lines of the right-eye image signal 404 are alternately arranged.

As described above, the conventional apparatus of FIG. 3 for generating a progressive stereoscopic image signal includes the first and second scalers 302 and 304, which scale up or down the left-eye image signal 402 and the right-eye image signal 404, respectively. Each of the first and second scalers 302 and 304 includes a memory, in which an image signal is stored, and an interpolator, which reads each of a plurality of scanning lines of the image signal from the memory and generates new scanning lines through interpolation.

The conventional apparatus for generating a progressive stereoscopic image signal, however, has a relatively complex display device structure and is costly because it includes the two scalers 302 and 304.

SUMMARY OF THE INVENTION

The present general inventive concept provides a method of generating a stereoscopic image signal, which can simplify a structure of an apparatus to generate the stereoscopic image signal and can reduce manufacturing costs of the apparatus to generate the stereoscopic image signal.

The present general inventive concept also provides a method of scaling a stereoscopic image signal, which can be used by the method of generating the stereoscopic image signal.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept may be achieved by providing a method of generating a stereoscopic image signal. The method includes receiving a left-eye image signal and a right-eye image signal, generating a progressive stereoscopic image signal by multiplexing the left-eye image signal and the right-eye image signal, and scaling up or down the progressive stereoscopic image signal.

The foregoing and/or other aspects and advantages of the present general inventive concept may also be achieved by providing a method of scaling a stereoscopic image signal. The method includes receiving a progressive stereoscopic image signal synthesized from a left-eye image signal and a right-eye image signal and scaling the progressive stereoscopic image signal by interpolating first interpolation scanning lines corresponding to the left-eye image signal using scanning lines of the left-eye image signal and inserting the first interpolation lines between the scanning lines of the left-eye image signal, interpolating second interpolation lines corresponding to the right-eye image signal using scanning lines of the right-eye image signal and inserting the second interpolation lines between the scanning lines of the right-eye image signal, and multiplexing the resulting left-eye image signal and the resulting right-eye image signal.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
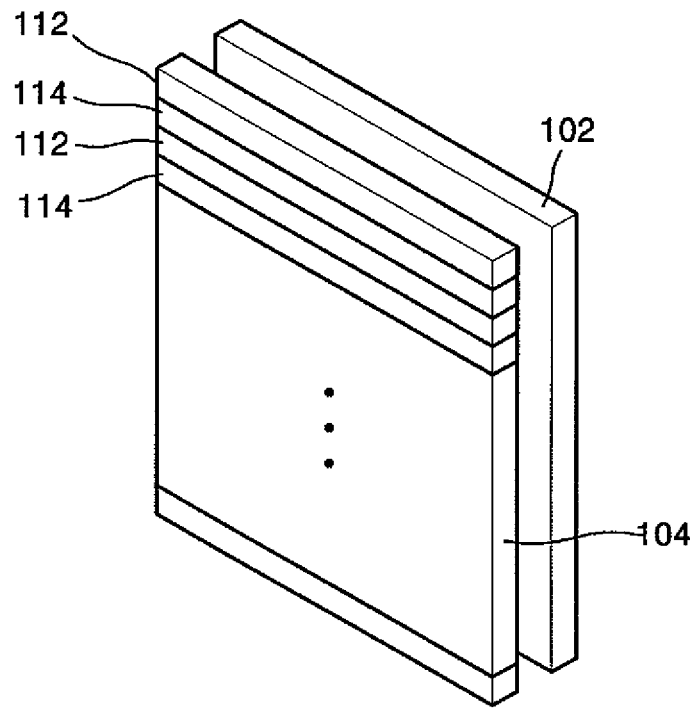
FIG. 1 is a diagram illustrating a conventional stereoscopic display device, of a polarization multiplexing type.
Figure 2:
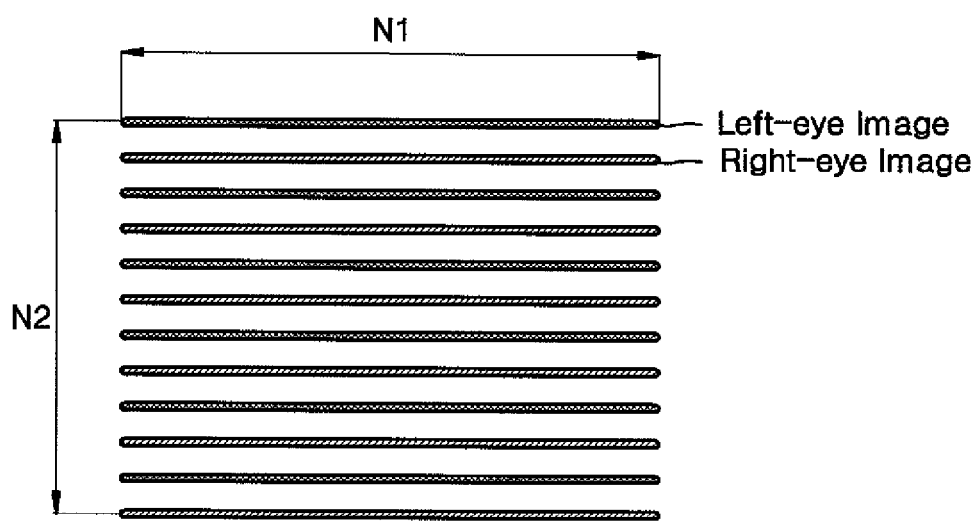
FIG. 2 is a diagram illustrating a progressive stereoscopic image signal displayed by the conventional stereoscopic display device of FIG. 1.
Figure 3:
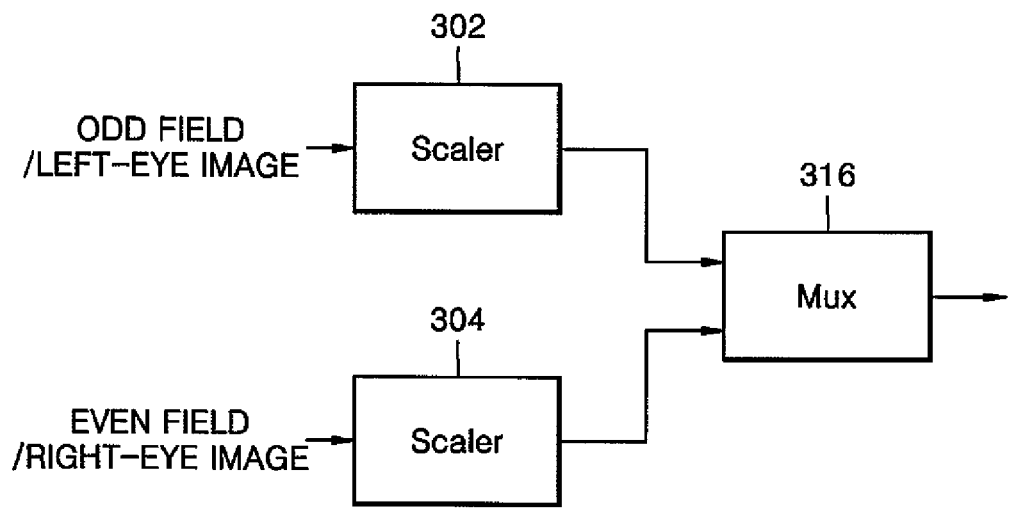
FIG. 3 is a block diagram illustrating a conventional apparatus for generating a progressive stereoscopic image signal.
Figure 4:
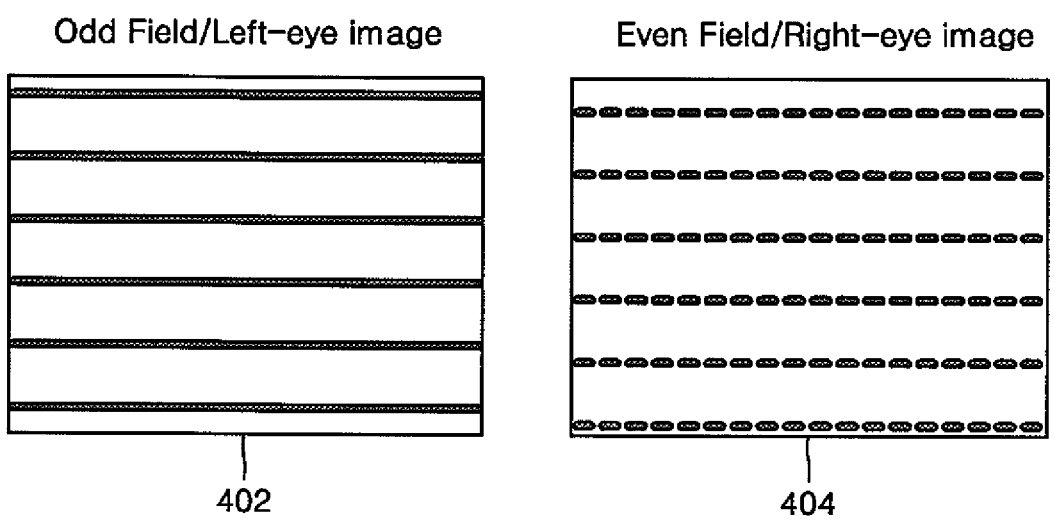
FIG. 4 is a diagram illustrating the operation of a multiplexer of the conventional apparatus of FIG. 3.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

In the description of the present general inventive concept below, a multiplexing operation denotes a process of synthesizing a left-eye image signal and a right-eye image signal alternately and includes alternation in scanning lines and alternation in pixels, Further, a scaling operation denotes a process of increasing or decreasing a number of pixels or scanning lines of an image signal and is also called frequency conversion or resolution conversion.

A scaling operation is classified into either a vertical scaling operation that increases or decreases the number of scanning lines of an image signal and a horizontal scaling operation that increases or decreases the number of columns of an image signal. Here, the number of columns of an image signal denotes the number of pixels in one scanning line of the image signal.

Figure 5:
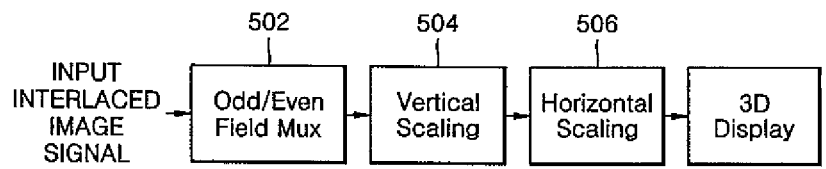
FIG. 5 is a flowchart illustrating a method of generating a stereoscopic image signal according to an embodiment of the present general inventive concept.

FIG. 5 is a flowchart illustrating a method of generating a stereoscopic image signal according to an embodiment of the present general inventive concept. The method of FIG. 5 is applied to generate a progressive stereoscopic image signal in which scanning lines of a left-eye image signal and scanning lines of a right-eye image signal are alternately arranged.

Referring to FIG. 5, the method of generating the stereoscopic image signal includes a multiplexing operation 502, a vertical scaling operation 504 and a horizontal scaling operation 506. Although FIG. 5 illustrates the method of generating the stereoscopic image signal, it is possible to implement the method into an apparatus to generate the stereoscopic image signal using a multiplexing unit, a vertical scaling unit, a horizontal scaling unit, and a 3D display to perform the multiplexing operation 502, the vertical scaling operation 504, the horizontal scaling operation 506, and a 3D display operation, respectively.

Specifically, in the multiplexing operation 502, a three-dimensional (3D) broadcast signal, i.e., an interlaced stereoscopic image signal, is received, and the progressive stereoscopic image signal is generated by multiplexing the received interlaced stereoscopic image signal.

In the vertical scaling operation 504, a size of the progressive stereoscopic image signal in a vertical scanning direction, i.e., a number of scanning lines of the progressive stereoscopic image signal, is increased or decreased by vertically scaling the generated progressive stereoscopic image signal. Specifically, a scaler scales the progressive stereoscopic image signal such that new scanning lines are generated by interpolating between every pair of consecutive even-numbered or odd-numbered scanning lines, and then the new interpolated scanning lines are inserted between the respective pairs of consecutive even-numbered or odd-numbered scanning lines. In a conventional vertical scaling method, a stereoscopic image signal is scaled using similarities between the respective pairs of adjacent scanning lines. Thus, the conventional vertical scaling method cannot be applied to a progressive stereoscopic image signal because every pair of adjacent scanning lines of the progressive stereoscopic image signal correspond to different image signals having different polarization characteristics that is, the left-eye image signal and the right-eye image signal respectively, rather than having any similarities there between as a conventional interlace image signal or a progressive image signal has.

In the vertical scaling operation 504 of FIG. 5, a progressive stereoscopic image signal is scaled by interpolation between every pair of consecutive even-numbered or odd-numbered scanning lines.

The odd-numbered scanning lines of the progressive stereoscopic image signal correspond to the left-eye image signal, and the even-numbered scanning lines of the progressive stereoscopic image signal correspond to the right-eye image signal. Therefore, there is a high correlation between every pair of consecutive even-numbered scanning lines and between every pair of consecutive odd-numbered scanning lines. Thus, it is possible to generate new scanning lines based on the correlation.

In a method of scaling a stereoscopic image signal according to an embodiment of the present invention, a scaled stereoscopic image signal is generated by generating new scanning lines for the left-eye image signal using scanning lines of the left-eye image signal, generating new scanning lines for the right-eye image signal using scanning lines of the right-eye image signal, and multiplexing the scanning lines of a input stereoscopic image signal and the newly generated lines through an interpolation operation.

Figure 6:
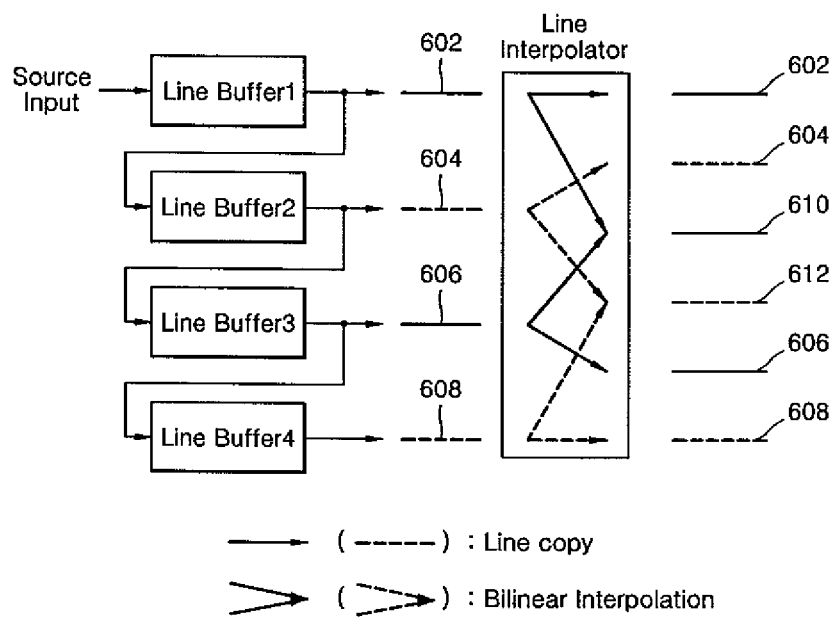
FIG. 6 is a diagram illustrating a vertical scaling method according to an embodiment of the present general inventive concept.

FIG. 6 is a diagram illustrating a vertical scaling method according to an embodiment of the present general inventive concept. The method of FIG. 6 is applied to a progressive stereoscopic image signal in which scanning lines of a left-eye image signal and scanning lines of a right-eye image signal are alternately arranged.

Specifically, FIG. 6 illustrates scaling of a first progressive stereoscopic image signal including four scanning lines into a second progressive stereoscopic image signal including six scanning lines.

Referring to FIG. 6, reference numerals 602 and 606 denote odd-numbered scanning lines of the first progressive stereoscopic image signal, which correspond to a left-eye image signal, and reference numerals 604 and 608 denote even numbered scanning lines of the first progressive stereoscopic image signal, which correspond to a right-eye image signal.

A line interpolator, which is illustrated in the middle of FIG. 6, interpolates a first interpolation line 610 using the odd-numbered scanning lines 602 and 606 and interpolates a second interpolation line 612 using the even-numbered scanning lines 604 and 608. Thereafter, the line interpolator inserts the first interpolation line 610 between the odd-numbered scanning lines 602 and 606 and inserts the second interpolation line 612 between the even-numbered scanning lines 604 and 608.

Thereafter, the interpolation results are multiplexed and then output. That is, lines are multiplexed and the output in order of 602, 604, 610, 612, 606 and 608. There are high spatial correlations between the first interpolation line 610 and the odd-numbered scanning lines 602 and 606 because the first interpolation line 610 is generated using the odd-numbered scanning lines 602 and 606 corresponding to the left-eye image signal, which are highly correlated to each other. Likewise, there are high spatial correlations between the second interpolation line 612 and the even-numbered scanning lines 604 and 608 because the second interpolation line 612 is generated using the even-numbered scanning lines 604 and 608 corresponding to the right-eye image signal, which are highly correlated to each other.

The above-described processes may be repeatedly and sequentially performed on other odd-numbered or even-numbered scanning lines of the progressive stereoscopic image signal until the stereoscopic image signal is vertically scaled to have a desired level of resolution. In other words, the progressive stereoscopic image signal is vertically scaled to have the desired level of resolution by performing an interpolation operation and a multiplexing operation on, for example, only n scanning lines of the progressive stereoscopic image signal located in a central portion of the progressive stereoscopic image signal, and then on other scanning lines of the progressive stereoscopic image signal. Accordingly, it is possible to considerably reduce a size of a scaler.

FIG. 6 illustrates the scaling of the first progressive stereoscopic image signal including four scanning lines into the second progressive stereoscopic image signal including six scanning lines. However, it is possible that the number of scanning lines by which the first progressive stereoscopic image signal is scaled may be determined depending on a desired level of resolution. In addition, although FIG. 6 illustrates where one line is newly generated for every two scanning lines and then interpolated therebetween, more than one line may be interpolated for two scanning lines of the image signal and then inserted therebetween.

FIG. 6 illustrates the application of the method of vertically scaling the progressive stereoscopic image signal in which the left-eye image signal and the right-eye image signal are alternately arranged in lines. The method of FIG. 6 can be used as the vertical scaling operation 504 of FIG. 5. However, a method of horizontally scaling a stereoscopic image signal according to an embodiment of the present general inventive concept, similar to the method of FIG. 6, can be applied to a progressive stereoscopic image signal in which a left-eye image signal and a right-eye image signal are alternately arranged in pixels. This method can be used as the horizontal scaling operation 506 of FIG. 5.

Figure 7:
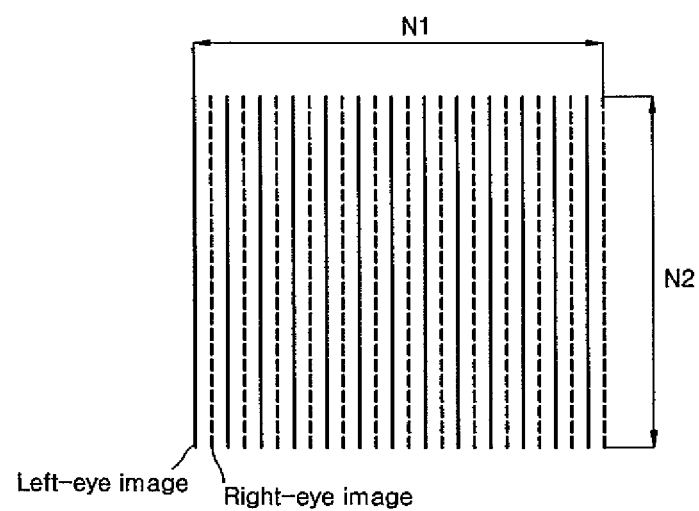
FIG. 7 is a diagram illustrating a progressive stereoscopic image signal.

FIG. 7 is a diagram illustrating the progressive stereoscopic image signal, in which the left-eye image signal and the right-eye image signal are alternately arranged in pixels. The progressive stereoscopic image signal of FIG. 7 can be horizontally scaled by generating new columns of pixels by interpolating between consecutive odd-numbered columns of pixels corresponding to the left-eye image signal and consecutive even-numbered columns of pixels corresponding to the right-eye image signal.

In a method of generating a stereoscopic image signal according to the present general inventive concept, a progressive stereoscopic image signal is generated by multiplexing a left-eye image signal and a right-eye image signal and then is input to a scaler such that the scaler scales the progressive stereoscopic image signal.

Since the scaler receives the progressive stereoscopic image signal in which a scanning line of the left-eye image signal and a scanning line of the right-eye image signal are alternately arranged, the scaler scales the progressive stereoscopic image signal in a manner that interpolates new scanning lines between existing scanning lines of each of the left-eye and right-eye image signals and then multiplexes the interpolation results.

As described above, according to the present general inventive concept, it is possible to simplify a structure of an apparatus to generate a stereoscopic image signal and reduce manufacturing costs of the apparatus to generate a stereoscopic image signal.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of generating a stereoscopic image signal, the method comprising:
    receiving a left-eye image signal and a right-eye image signal with a multiplexer;
    generating a progressive stereoscopic image signal by multiplexing the left-eye image signal and the right-eye image signal with the multiplexer by multiplexing the left-eye image signal and the right-eye image signal such that scanning lines of the left-eye image signal and scanning lines of the right-image signal are alternately arranged; and
    scaling up or down the generated progressive stereoscopic image signal by vertically scaling with a vertical scaler and horizontally scaling with a horizontal scaler the generated progressive stereoscopic image signal, and by interpolating between consecutive scanning lines of the left-eye image signal and interpolating between consecutive scanning lines of the right-eye image signal to generate alternately arranged intermediate scanning lines of the left-eye and right eye signals,
    wherein the progressive stereoscopic image signal is generated before the scaling up or down of the generated progressive stereoscopic image signal.

2. A method of generating a stereoscopic image signal, the method comprising:
    receiving a left-eye image signal and a right-eye image signal with a multiplexer;
    generating a progressive stereoscopic image signal by multiplexing the left-eye image signal and the right-eye image signal with the multiplexer such that pixels of the left-eye image signal and pixels of the right-eye image signal are alternately arranged; and
    scaling up or down the generated progressive stereoscopic image signal with at least one scaler by interpolating between consecutive pixels of the left-eye image signal and interpolating between consecutive pixels of the right-eye image signal to generate alternately arranged intermediate pixels of the left-eye and right eye signals,
    wherein the progressive stereoscopic image signal is generated before the scaling up or down of the generated progressive stereoscopic image signal.

3. A method of generating a stereoscopic image signal, the method comprising:
    receiving a left-eye image signal and a right-eye image signal with a multiplexer;
    generating a progressive stereoscopic image signal by multiplexing the left-eye image signal and the right-eye image signal with the multiplexer; and
    scaling up or down the generated progressive stereoscopic image signal by vertically scaling with a vertical scaler and horizontally scaling with a horizontal scaler the generated progressive stereoscopic image signal, and by buffering lines of the generated progressive stereoscopic image signal to interpolate first new lines between even-numbered lines of the buffered lines, and second new lines between odd-numbered lines of the buffered lines such that the generate progressive stereoscopic image signal is scaled,
    wherein the progressive stereoscopic image signal is generated before the scaling up or down of the generated progressive stereoscopic image signal.

4. The method of claim 3, further comprising:
    displaying the first new lines and the even-numbered lines as a new left-eye image signal, and the second new lines and the odd-numbered lines as a new right-eye image signal.

5. The method of claim 3, wherein the first new lines are inserted between each pair of consecutive even-numbered lines, and the second lines are inserted between each pair of consecutive odd-numbered lines.

6. The method of claim 3, wherein the lines comprise one of scanning lines and pixels in the scanning lines.

7. A method of scaling a stereoscopic image signal, comprising:
    receiving a progressive stereoscopic image signal synthesized from a left-eye image signal and a right-eye image signal; and
    scaling the received progressive stereoscopic image signal by interpolating first interpolation scanning lines corresponding to the left-eye image signal using scanning lines of the left-eye image signal and inserting the first interpolation lines between the scanning lines of the left-eye image signal, interpolating second interpolation lines corresponding to the right-eye image signal using scanning lines of the right-eye image signal and inserting the second interpolation lines between the scanning lines of the right-eye image signal, and multiplexing a resulting left-eye image signal and a resulting right-eye image signal,
    wherein the progressive stereoscopic image signal is generated and received before the scaling up or down of the received progressive stereoscopic image signal.

8. The method of claim 7, wherein the multiplexing of the resulting left-eye image signal and the resulting right-eye image signal comprises:
    multiplexing the resulting left-eye image signal and the right-eye image signal such that scanning lines of the resulting left-eye image signal and scanning lines of the resulting right-eye image signal are alternately arranged.

9. The method of claim 7, wherein the multiplexing of the resulting left-eye image signal and the resulting right-eye image signal comprises:
    multiplexing the resulting left-eye image signal and the resulting right-eye image signal such that pixels of the resulting left-eye image signal and pixels of the resulting right-eye image signal are alternately arranged.

10. The method of claim 7, wherein the scaling of the received stereoscopic image signal comprises:
sequentially inputting and updating n scanning lines of the progressive stereoscopic image signal sequentially inputting and updating through an interpolation operation and a multiplexing operation, and sequentially inputting and updating other scanning lines of the progressive stereoscopic image signal through the interpolation operation and the multiplexing operation, wherein n is an integer smaller than a total number of scanning lines of the progressive stereoscopic image signal.

11. A method of generating a stereoscopic image signal, comprising:
multiplexing a first image signal and a second image signal with a multiplexer to form a combined image signal by combining the first and second image signals such that the first image signals form odd scanning lines of the combined image signal and the second image signals form even scanning lines of the combined image signal; and
adjusting a resolution of the combined signal by vertically scaling and horizontally scaling the combined signal with a vertical scaler and a horizontal scaler, respectively, by interpolating between consecutive odd scanning lines of the combined signal to generate at least one intermediate odd scanning line between the consecutive odd scanning lines and interpolating between consecutive even scanning lines of the combined signal to generate at least one intermediate even scanning line between the consecutive even scanning lines,
wherein the combined signal is generated before the vertical scaling and horizontal scaling of the combined signal with the vertical scaler and the horizontal scaler.

12. A method of generating a stereoscopic image signal, comprising:
multiplexing a first image signal and a second image signal with a multiplexer to form a combined image signal; and
adjusting a resolution of the combined image signal with a scaler by interpolating between consecutive odd numbered pixels of the combined signal to generate at least one intermediate odd numbered pixel between the consecutive odd numbered pixels, and interpolating between consecutive even numbered pixels of the combined signal to generate at least one intermediate even numbered pixel between the consecutive even numbered pixels,
wherein the multiplexing of the first image signal and the second image signal with the multiplexer comprises:
combining the first and second image signals with the multiplexer such that the first image signal forms odd numbered pixels of the combined image signal and the second image signal forms even numbered pixels of the combined image signal, and wherein the combined signal is generated before the adjusting the resolution of the combined image signal with the scaler.

13. An apparatus to generate a stereoscopic image signal, comprising:
a multiplexer to multiplex a left-eye image signal and a right-eye image signal into a progressive stereoscopic image signal; and
a scaler to scale the progressive stereoscopic image signal multiplexed in the multiplexer by vertically scaling and horizontally scaling the progressive stereoscopic image signal,
wherein the progressive stereoscopic image signal comprises a plurality of scanning lines, and the scaler includes a line interpolator to interpolate between consecutive odd numbered scanning lines to generate intermediate odd numbered scanning lines between the consecutive odd numbered scanning lines and to interpolate between consecutive even numbered scanning lines to generate intermediate even numbered scanning lines between the consecutive even numbered scanning lines, and
wherein the progressive stereoscopic image signal is generated before the scaler scales the progressive stereoscopic image signal by the vertical scaling and the horizontal scaling.

14. An apparatus to generate a stereoscopic image signal, comprising:
a multiplexer to multiplex a left-eye image signal and a right-eye image signal into a progressive stereoscopic image signal; and
a scaler to scale the progressive stereoscopic image signal multiplexed in the multiplexer by vertically scaling and horizontally scaling the progressive stereoscopic image signal, the scaler including:
a plurality of line buffers to generate odd-numbered lines and even-numbered lines from the combined image signal; and
an interpolator to interpolate first lines between each pair of consecutive even-numbered lines and second lines between each pair of consecutive odd-numbered lines,
wherein the progressive stereoscopic image signal is generated before the scaler scales the progressive stereoscopic image signal by the vertical scaling and the horizontal scaling.

* * * * *